Inventor
Max N. Silber
By George E. Frost - Keith J. Kulie
Attorneys

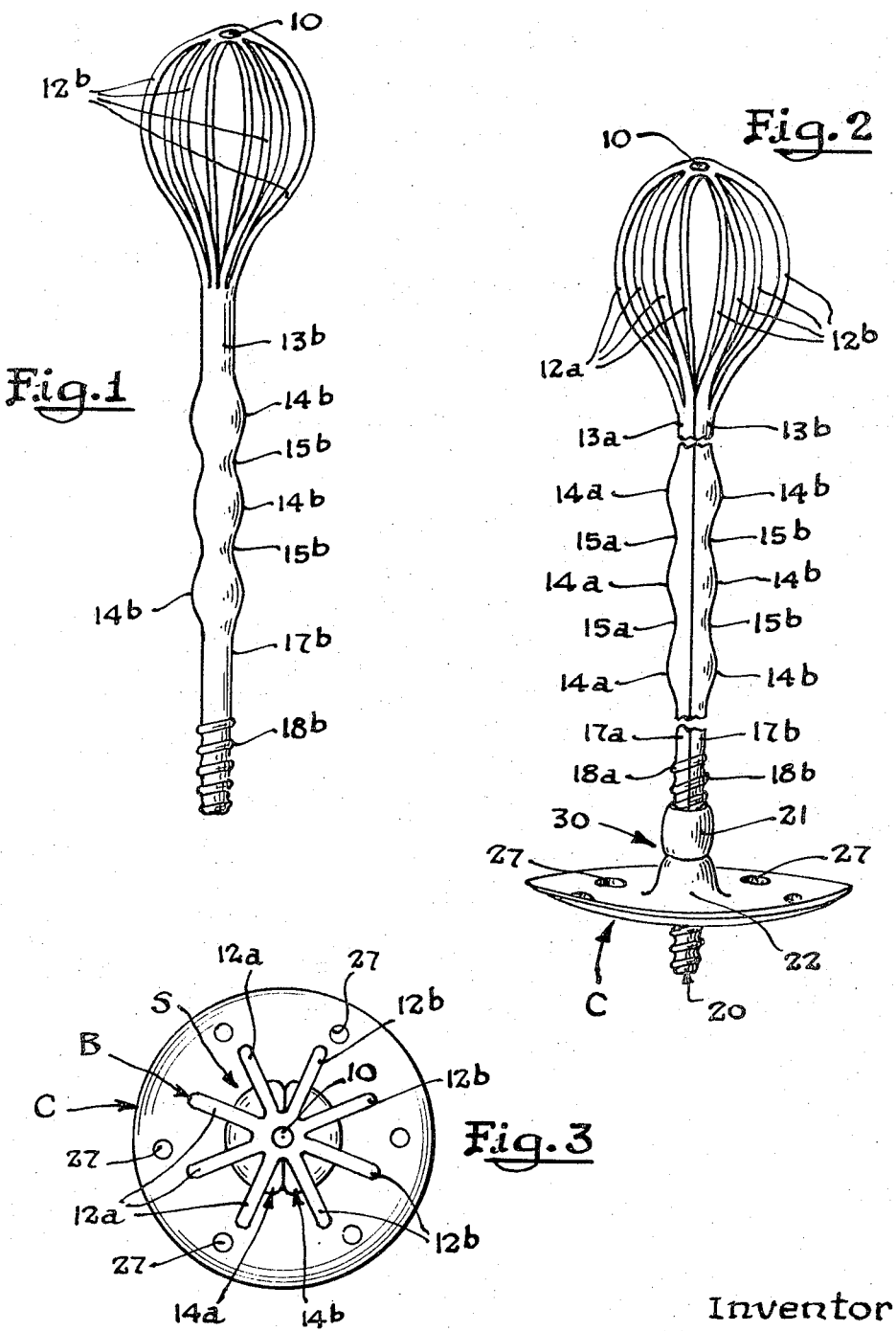

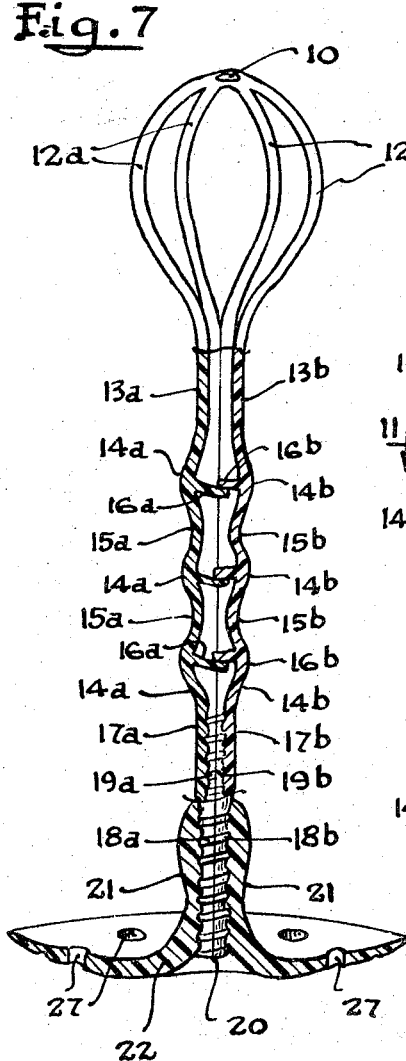

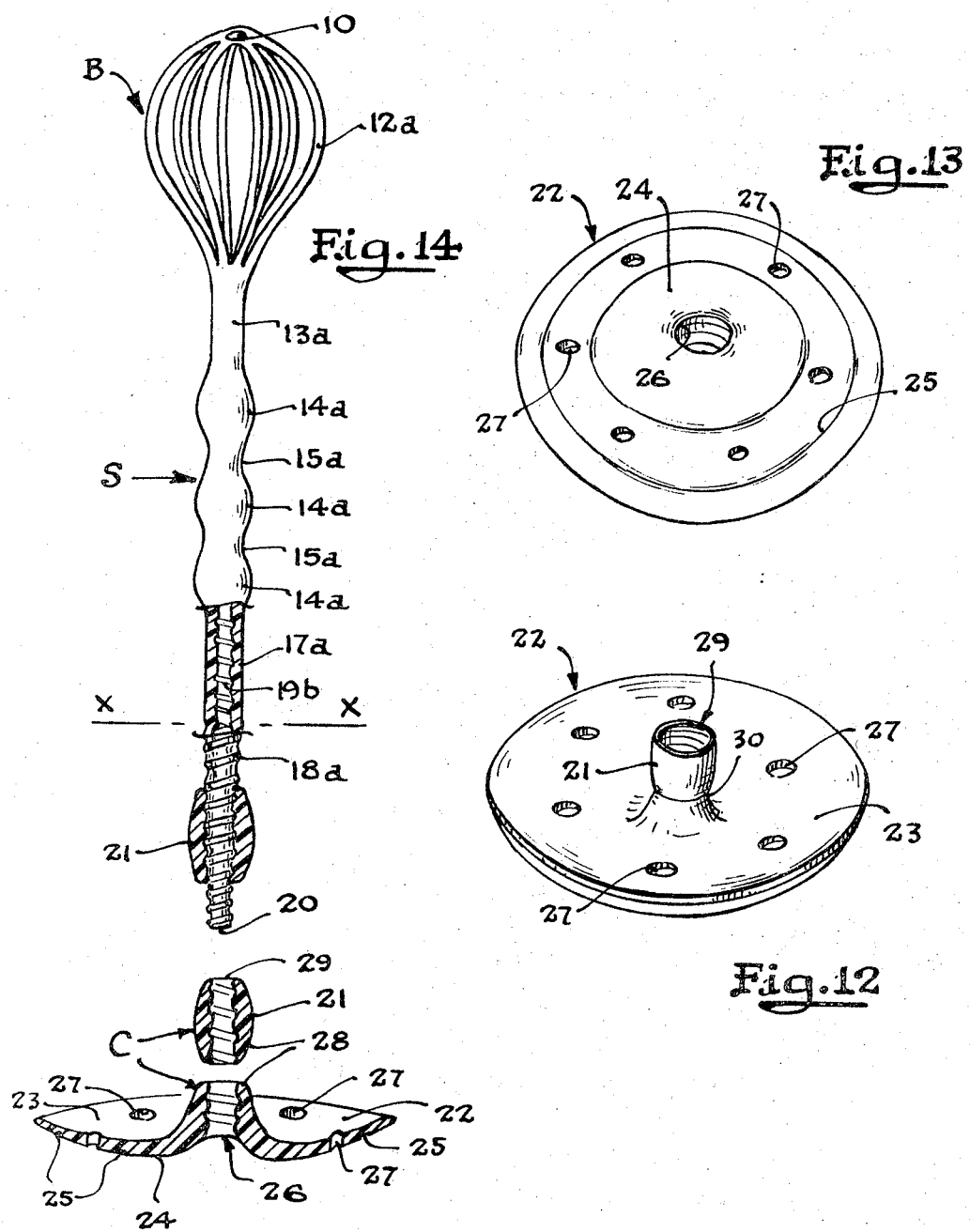

April 4, 1967    M. N. SILBER    3,312,215
UTEROCERVICAL CANNULA
Filed Aug. 2, 1963    9 Sheets-Sheet 5

Inventor
Max N. Silber
By George E. Frost - Keith J. Kulie
Attorneys

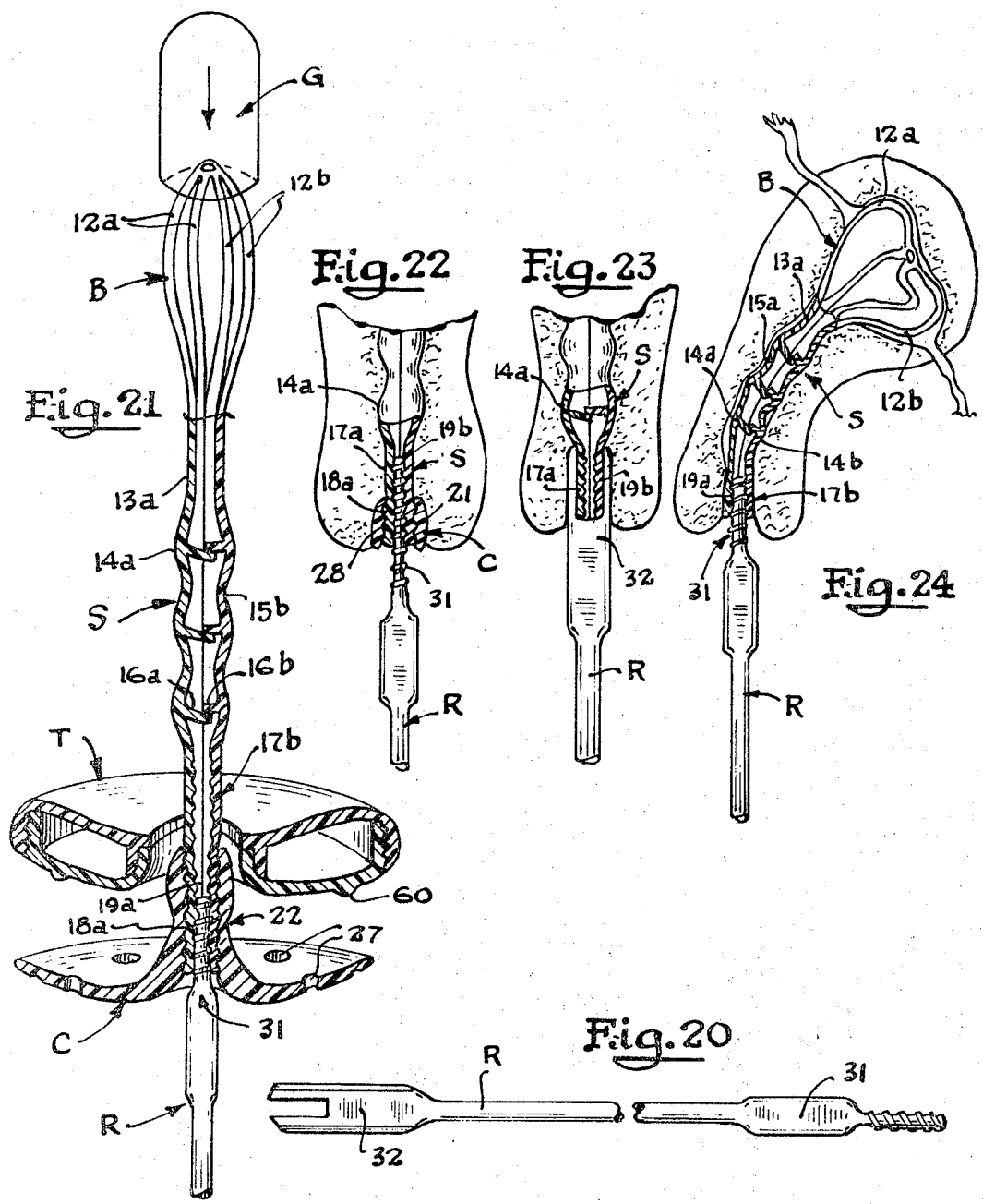

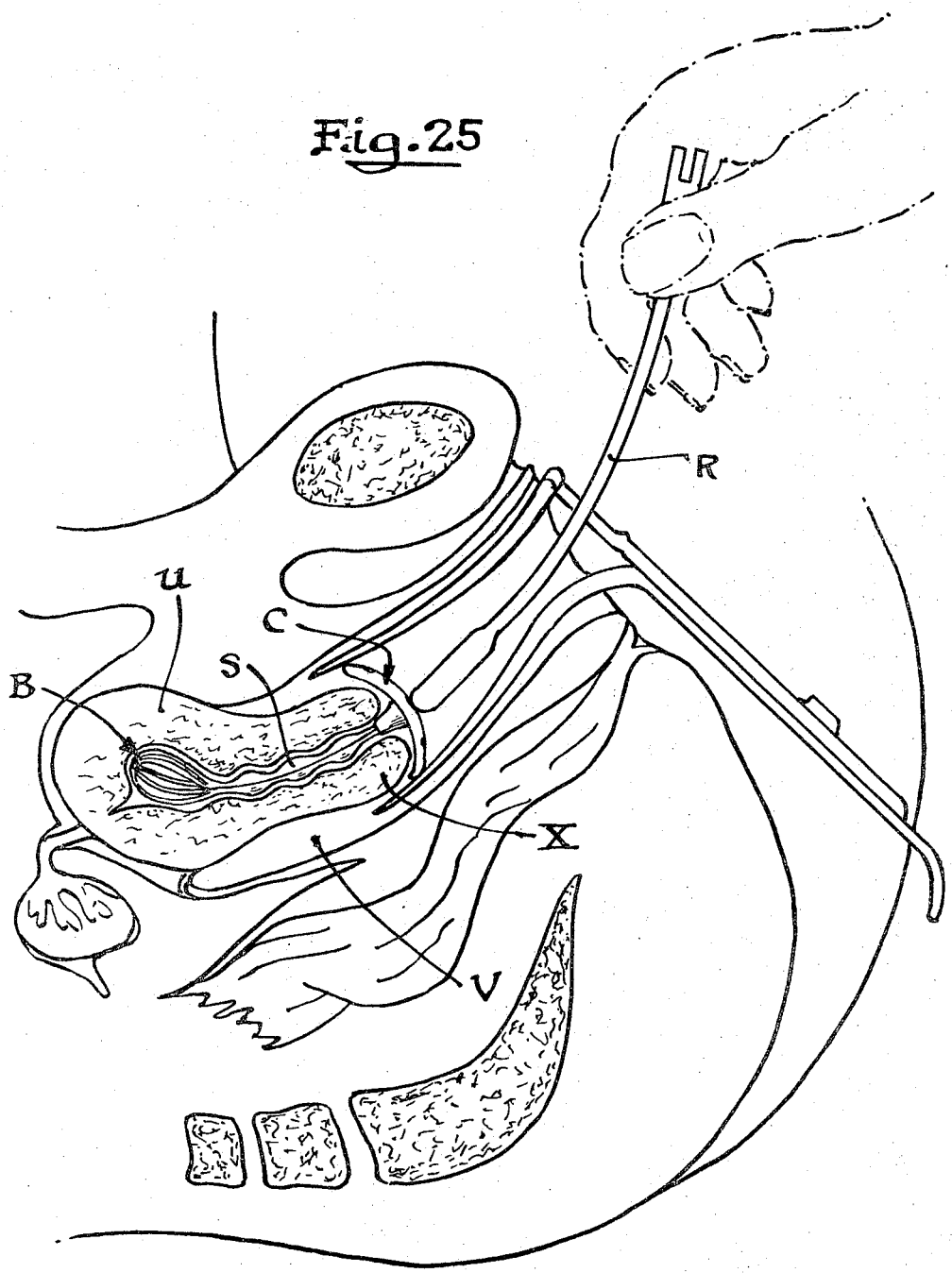

April 4, 1967  M. N. SILBER  3,312,215
UTEROCERVICAL CANNULA

Filed Aug. 2, 1963  9 Sheets-Sheet 8

Inventor
Max N. Silber
By George E. Frost – Keith J. Kulie
Attorneys

April 4, 1967  M. N. SILBER  3,312,215
UTEROCERVICAL CANNULA
Filed Aug. 2, 1963  9 Sheets-Sheet 9
Fig. 31
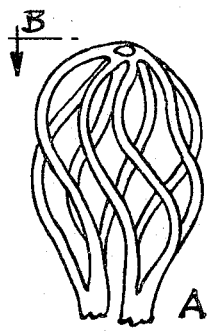
A
Fig. 32
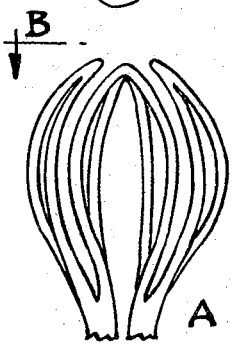
A
Fig. 33
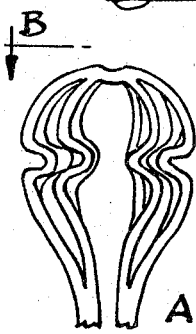
A
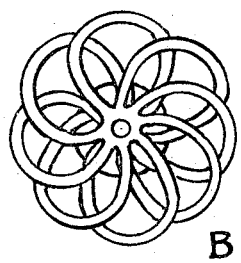
B
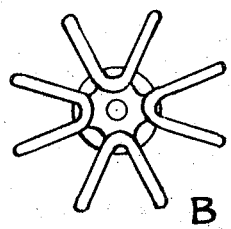
B
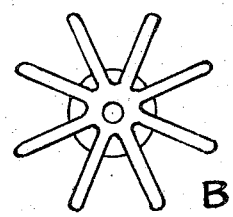
B
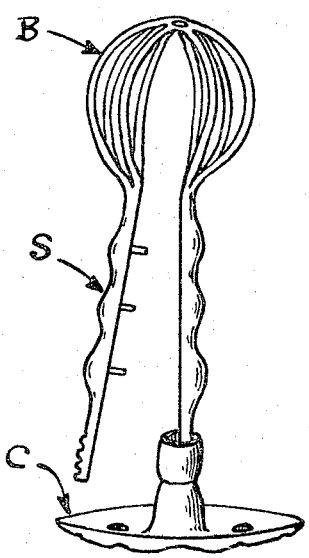
Fig. 30
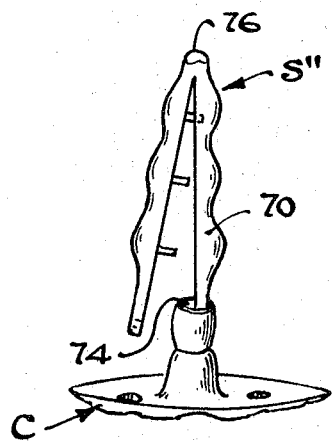
Fig. 34
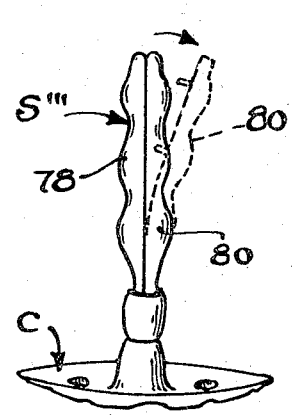
Fig. 35
Inventor
Max N. Silber
By George E. Frost – Keith J. Kulie
Attorneys United States Patent Office 3,312,215
Patented Apr. 4, 1967

3,312,215
UTEROCERVICAL CANNULA
Max N. Silber, 8519 N. Trumbull, Skokie, Ill. 60076
Filed Aug. 2, 1963, Ser. No. 299,669
18 Claims. (Cl. 128—131)

The present invention relates to an improved multi-purpose uterocervical cannula adapted to be received in the human cervix and to extend into the uterus.

A variety of conditions may require the use of such an intrauterine or uterocervical cannula. These include displacements, flexures, versions, malformations, adhesions, and contractures of the uterus wherein the loss of positional integrity of this organ is threatened, or has occurred, and where structural organ support is helpful. Where for various reasons, distortion and functional obliteration of the cervical canal is threatened or has occurred, more permanent sequelae may be prevented, and often, normal functions restored, by the use of such an appropriate cannula. The patency of the cervical canal may also be maintained. The traumatic sequelae of post-surgical inflammation and edema, and likewise following electrocautery, may frequently be aided or prevented by the use of such an appropriate cannula.

Many diagnostic routines may be facilitated by the use of such cannula, particularly such procedures as the determination of tubal patency and integrity, and intrauterine cytological study.

Also, many medical treatment routines may be expedited by the use of such an appropriate cannula. These include intrauterine irrigation and insufflation; intrauterine, intracervical, and endocervical helio-conduction with ultraviolet light; and endocervical and intravaginal medical treatment with suspended dissemination of liquid, semi-solid, solid, or radio-active therapeutic materials.

It is the intention and general object of this invention to provide an efficient and reliable cannula apparatus to provide full and continuous exit of normal fallopian tube and intrauterine secretion despite conditions such as described above which otherwise may obstruct the normal passage of fluid from the intrauterine space through the cervical canal into the vagina to preclude such drainage.

An additional object of the present invention resides in the provision of an apparatus which will maintain the patency of the cervical canal and yet will prevent retrograde (backward) drainage from the vagina into the uterus, especially of douche fluid and materials carried thereby.

Furthermore, it is an object of the present invention to provide an improved cannula useful in various diagnostic and treatment routines wherein an entrance into the uterine cavity must be available without the painful and time-consuming procedure of frequent and repeated mechanical dilation of the cervical canal.

It is another object of the present invention to provide an improved intrauterine cannula and accessory members which can be easily molded from a variety of plastic materials, or from a combination of plastic materials, or from a combination of plastic and other materials, which will in processed form possess the following characteristics: be chemically inert; be soft and pliable; be smooth and non-irritable to tissues; be sufficiently rigid as to be shape and contour retaining; be easily severed to exact patient dimension; be made transparent and light conductive; be light in weight; be sterilizable and, optionally self-disinfecting; be durable to withstand prolonged use; and be inexpensive and clinically disposable.

Still another object of the present invention is to provide an improved uterocervical cannula uniquely and specifically designed to be retained within the uterus by a shape variable cage-like bulb or spindle composed of a series of very pliable, flexible, looping fibers or arms, in light contact with the intrauterine walls, taking the shape of the particular intrauterine contour, and terminating as a hollow, split, tubular structure traversing the length of the cervical canal, thus defining a cannula with a headed member received by the fundus of the uterus, and a stem member extending thru the cervical canal opening into the vagina.

A further object of the present invention resides in provision of a cannula wherein a split stem member is adjustably attachable to and held together in the cannula-defining position by a collar-like member that spans the cervical opening to anchor the device against upward movement.

Another object of the present invention resides in provision of an apparatus which will serve as a vehicle for a variety of gynecological medication devices and diagnostic faculties of appropriate design.

An additional object of the present invention is to provide an improved cannula having a series of annular devices composed of suitable material varying from smooth to spongy texture and of varying density and porosity, such devices to be incorporated within various medications as a vehicle or in which medication may be incorporated so as to be conveniently attachable to and carried on a surface of a collar member.

Still another object of the present invention resides in the provisions of an improved uterocervical cannula having a chamber defining closable container or cassette which may conveniently be attachable to a collar-like member which collar member is adapted for the receipt of medication for radiation therapy when sealed and appropriately shielded.

It is another object of the present invention to provide for the handling, introduction, and removal of an improved uterocervical cannula and its components by means of an additional special component or rod-like structure will facilitate the work of the practicing physician.

The novel features of my invention which I believe to be characteristic thereof are set forth with particularity in the appended claims. My invention itself, however, together with further objects and advantages thereof, will best be understood by reference to the accompanying drawings, in which:

FIGURE 1 is a view in axial elevation of the device of the present invention;

FIGURE 2 is a view of the headed stem member of FIGURE 1, as seen from lines 2—2, FIGURE 1, with the collar member attached;

FIGURE 3 is a top plan view of the device of FIGURE 2;

FIGURE 7 is a view in partial section of the headed stem member of FIGURES 4-6, in folded position, with the collar member attached;

FIGURE 8 is a fragmentary sectioned view, in perspective, with parts broken away from one of the bulbar enlargements of the stem;

FIGURE 9 is a fragmentary cross-section taken along line 9—9, of FIGURE 8;

FIGURE 10 is a view, like FIGURE 8, of an alternative stem form;

FIGURE 11 is a cross-section view taken along lines 11—11, FIGURE 10;

FIGURE 12 is a perspective view of the collar member showing the concave face thereof and the collar extension;

FIGURE 13 is a view of the convex face of the collar;

FIGURE 14 is an exploded axial view in partial section of the cannula with the hub extension of the collar cut away and attached to the threaded end of the stem member;

FIGURE 20 is a view of the introduction rod, partly in section;

FIGURE 21 is an elevation partially in cross-section, of the assembled cannula unit with gelatin capsule affixed and the introducer rod attached;

FIGURE 22 is a fragmentary view of the unit of FIGURE 21 as inserted in uterine canal in use with only the hub portion;

FIGURE 23 is a view like FIGURE 22, without hub or cap in use, and with the introducer rod appropriately affixed for introduction of cannula;

FIGURE 24 is a view similar to FIGURE 23 with the introducer rod appropriately affixed for removal of cannula;

FIGURE 25 is a schematic saggital section in view of a pelvis with normal uterus showing the assembled cannula and affixed introducer rod in use;

FIGURE 30 is a view in axial elevation of an alternative form of the cannula as a one piece unit shown in partial extension of the stem;

FIGURE 31A shows an alternative form of the bulb or head portion of the cannula, in fragmentary side view;

FIGURE 31B is a top view of the cannula of FIGURE 31A;

FIGURE 32A shows still another form of the bulb;

FIGURE 32B is a top view of the cannula head of FIGURE 32A;

FIGURE 33A is a fragmentary side elevation of still another form of the bulb or head of the cannula;

FIGURE 33B is a top view of the bulb of FIGURE 33A.

FIGURE 34 is a side elevation of a modified form of the cannula of the present invention without the flexible bulbous head portion; and FIGURE 35 is a view of still another modification of the headless cannula with integral collar and the split stem.

Referring now to FIGURES 1 and 2, the cannula in its preferred form consists of a unitary member indicated generally at B–S. This member is generally symmetrical about its longitudinal axis and, as shown, defines a bulbous headed end B, from which a generally tubular stem element, S, extends. As seen in FIGURE 2, from line 2—2 of FIGURE 1, and as hereinafter described in detail, the stem S is longitudinally split, dividing the cannula member into two symmetrical and congruous halves, B$a$, S$a$, and B$b$, S$b$, which are contiguous and integrally united only at the headed end at 10. In use the two halves, B$a$, S$a$, and B$b$, S$b$, are held together in juxtaposed relation, by the engagement of the stem parts S$a$, and S$b$, with all or part of an integrally separate collar member, C, or alternatively by the cervix, as is hereafter described.

Figure 4:
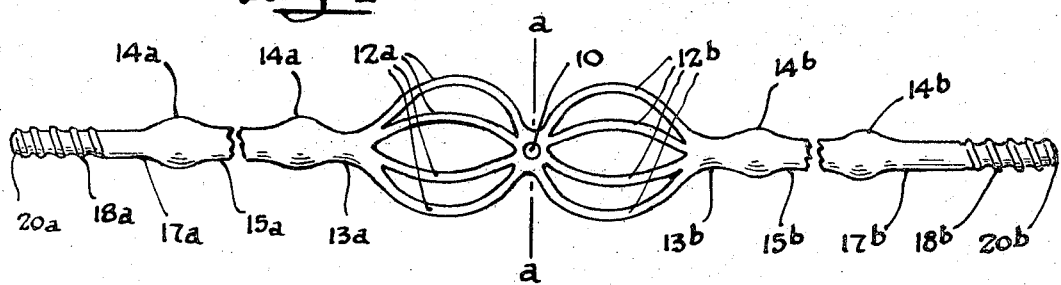
FIGURE 4 is a view of the headed stem member of FIGURE 1, with the device in the extended or spread position.
Figure 5:
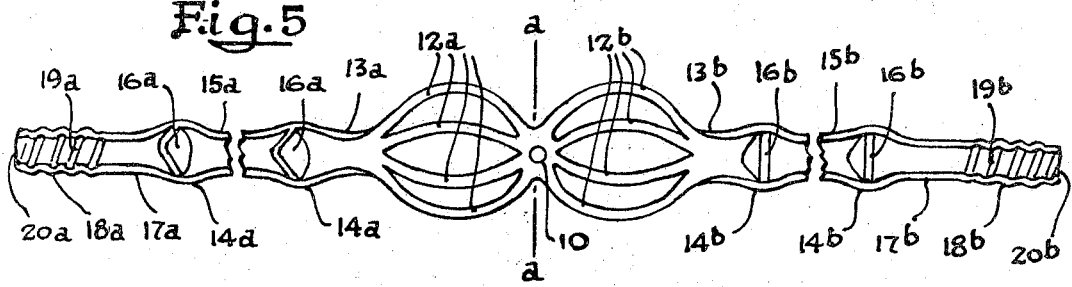
FIGURE 5 is a view of the headed stem of FIGURE 4, taken from the face down side of the member of FIGURE 4, revealing the intracannular components.

The unit member B–S is initially formed by molding, preferably in the unitary, completely extended flat condition shown in FIGURES 4 and 5 where it is seen to be substantially symmetrical about axis $a$—$a$. From each side of this central axis $a$—$a$, a series of spider-like arms, or fibrils, 12$a$ and 12$b$ diverge radially and hemispherically from the point 10 as indicated. Distal to the point 10, the fibrils 12$a$ and 12$b$, converge, unite and merge with, and continue as the symmetrical, semi-cylindrical stem halves, S$a$ and S$b$, respectively. When both halves B$a$S$a$, and B$b$S$b$, of this cannula member B–S, are brought from the flattened, axial positions of FIGURES 4 and 5, to the partially folded position of FIGURE 6, and finally to the completely folded position of FIGURE 7, the spider-like fibrils 12$a$, and 12$b$, flex radially and symmetrically to accommodate themselves to the position of the stem portions, 13$a$ and 13$b$, respectively. Because of the radial symmetry of the device, the portions adjacent the apex and 10, are centered and stellate, and form there a hemispherical dome, the remote ends of the fibrils of which likewise, hemispherically are aligned with the stem parts S$a$ and S$b$, and their portions 13$a$ and 13$b$, respectively. The intermediate portions of the resultant semicircular component fibrils, 12$a$ and 12$b$, flex in accordance with their resiliency to define the spherical cage, head, or bulb, B, as shown in FIGURE 7. In the true spirit of this invention, because of the extreme flexibility ascribed to the fibrils 12$a$ and 12$b$, it is unnecessary to ascribe to the fibrils any particular bulbous shape outside the uterus, and indeed, any number of modifications of the preferred form may be defined, designed, and used, so long as they generally span out and thus bear gently against the intrauterine walls when in place, as shown in FIGURES 24–29 defined hereinafter. Preferably, the uncompressed diameter of the member head or bulb B, should be no larger than about one-third of the length of the stem element S, enough for its fibrils 12$a$ and 12$b$, to be of sufficient length to rest with gentle snugness against the normally physiologically compressed uterus. The stem element S, of this member, and its component halves, S$a$, and S$b$, are originally molded to be of sufficient length to provide a selection of such proportions as suited to the individual patient, as hereinafter described.

FIGURE 24–29 show the cannula in position with a number of different shapes and positions of the uterus. In FIGURE 25 the uterus is shown in the most common position. As shown, the spindle-like head element B, is defined by the series of loop-like fibrils, 12$a$ and 12$b$, which, because of their extreme flexibility, are deformed by the walls of the uterus, to fan out and assume the resultant particular intrauterine shape as shown. The arms 12$a$ and 12$b$ are of such soft and flexible plastic material as to bear very gently against the uterine surface. While each individual arm at each particular point bears only lightly against the intrauterine wall, collectively they define a substantial contact which serves adequately to retain the unit securely in position, without giving rise to any undue rubbing or friction action at any part of the uterus, particularly at the internal os of the cervical canal. At their points of convergence to form portion (13) of the stem S, the arms (12$a$) and (12$b$) are so freely bendable, and like the leaves of an automobile spring, glide over each other in bending or flexing, so that no pressure or friction of significance is exerted at the os uteri internum. This is a factor of prime importance in this invention, since most cannulas on the market today are not free of eroding or cutting action at the os uteri internum and often tend to slip out of the cervical canal. The construction of the present invention tends to obviate this problem and its traumatic sequelae.

Figure 6:
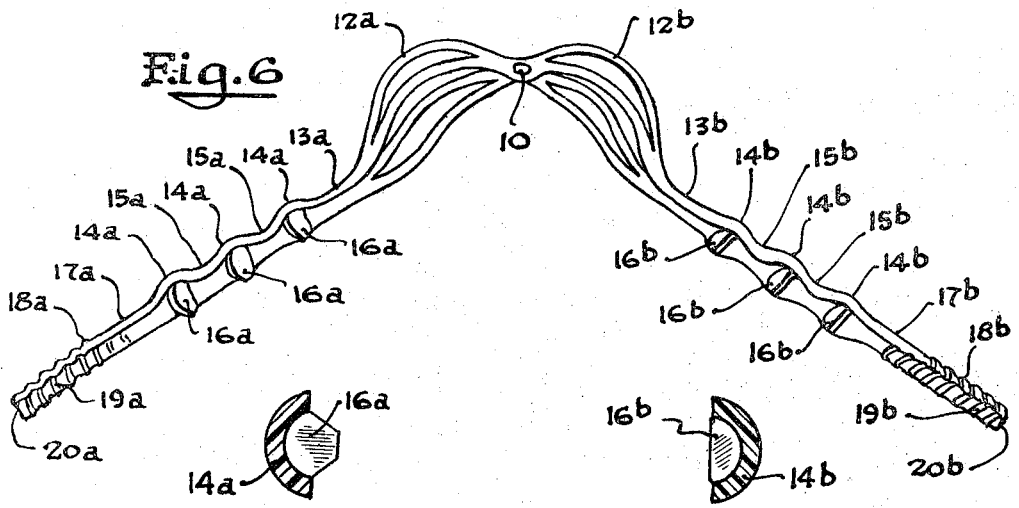
FIGURE 6 is a view, in axial section, of the headed stem member of FIGURES 4 and 5 in partially extended position, illustrating valve members in exploded position.

As shown in FIGURES 4, 5, and 6, the semi-tubular stem parts Sa, and Sb, are each divided into a number of semicylindrical portions 13a, 13b; 15a, 15b; 17a, 17b; and 18a, 18b, respectively, and also into a series of externally identical, hemispherical, bulbar portions, labelled 14a, or 14b, respectively. The portions 13a, 13b; 15a, 15b; 17a, 17b; and 18a and 18b essentially are of uniform wall thickness and maximum outside radius. The wall thicknesses of portions 14a, and 14b, are essentially the same as the rest of the stem portions, but in maximum internal radius they are about twice as large as the balance of the stem portions. These stem portions, 14a and 14b, are linearly spaced on the stem parts Sa and Sb, so that they separate stem portions 13a, 13b, from 15a, 15b; suceeding portions 15a, 15b and portions 15a, 15b from 17a, 17b respectively. It should be observed that although portions 13a, 13b; 17a, 17b; and 18a, 18b preferably have appreciable length, the portions 15a, 15b, have only nominal length, and primarily identify the linear distance between the various portions 14a, and the various portions 14b, respectively. When the stem portions noted above and on parts Sa, and Sb, respectively, are approximated lengthwise, they mate in juxtaposition to each other, and within the confines of the bulbar enlargements of portions 14a, and 14b, there is created a cavernous space. When the cannula is in position of use, the bulbar stem portions 14a, 14b, are received within the cervical canal where they serve, among other purposes, to anchor the cannula intracervically against longitudinal displacement.

In the preferred construction of stem part Sb, FIG-URES 4, 6, 7, there is located within the bulbar enlargements of the portions 14b, a plurality of thick, inflexible, semicircular webs, 16b, forming a series of valve seats therein. On the stem part Sa, there is correspondingly located within the enlargements of the portions 14a, a series of thin, flexible nearly circular leaves, 16a, forming a series of valve flaps, which cooperate with the valve stops, 16b, when the stem parts Sa and Sb are approximated.

As indicated in FIGURES 8, 9, 10, 11, the valve flaps 16a, and the valve seats 16b are located in the line of maximum radius of their respective bulbar enlargements, by a line of seal extending entirely around the interiors of the corresponding semi-circular bulbar portions 14a and 14a, respectively. With the valve flap 16a seated against the valve seat 16b, the cooperating parts obstruct the flow of fluid or other matter. The location of the valve parts 16a and 16b at the maximum radius of the bulbous enlargements makes possible a more flexible, more freely movable and more adequately functioning valve flap than would otherwise be possible. This is in part due to the greater surface of the valve flap 16a exposed to the fluid pressure and in part due to the lesser degree of flexure of the valve flap 16a in order to pass fluid or other matter in the valve-opening direction.

As shown in FIGURE 8, the movable valve flap 16a is sealed and anchored to the inner wall of the cavernous semi-tubular space, in position to lie just below the valve seat 16b. In this instance the valve flap 16a flexes toward open position in response to fluid pressure on the uterus side of the valve and flexes towards closed position in response to fluid pressure in the vaginal side. This provides uterine drainage and arrests the flow of matter from the vagina into the uterus. Alternatively, if desired, or necessary for diagnostic or therapeutic use of the cannula, the intracannular fluid flow direction may be reversed by placing the parts Sa and Sb slightly out of axial alignment as is shown in FIGURES 10 and 11. In this case the valve flaps overlay the valve seats 16b and define a valve that permits flow from the vagina to the uterus and arrests flow in the opposite direction.

Stem portions Sa and Sb, in their terminal portions 18a, 18b distal to the axis a—a, FIGURES 4 and 5, are externally formed in a series of smoothly rounded screw thread defining grooves and ribs as indicated at 18a and 18b. Each such portion defines one-half of the screw thread defining conformation. When the stem parts Sa and Sb are juxtaposed or approximated as in FIGURE 7, the portions 18a and 18b define a single complete and continuous external screw thread conformation.

The internal surfaces 19a and 19b of the stem parts Sa and Sb are also in the form of helical grooves and ribs. With the stem parts in juxtaposed relation as in FIGURE 7, these form internal threads. The threads defined by surfaces 19a and 19b and those defined by surfaces 18a and 18b extend a sufficient distance along stem parts Sa and Sb to permit adjustment of the length of the stem as hereinafter described.

Figure 26:
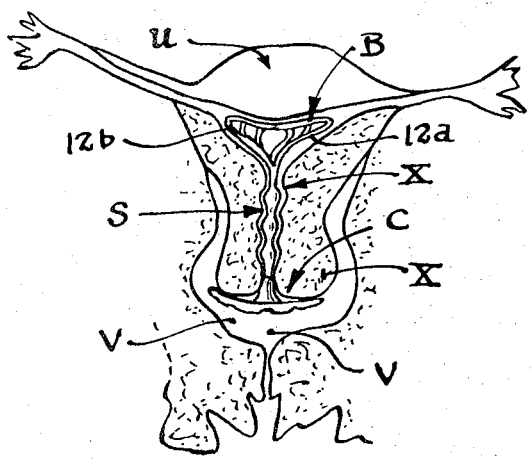
FIGURE 26 is a schematic frontal section of a normally shaped uterus containing cannula with attached collar member.

The collar member C, FIGURES 3 and 12–14, has a hub portion 21 upstanding from a somewhat upwardly concave disk-like cap part 22. About midway along its length hub 21 is scored by a superficial groove 30, at which point it may easily be cut into two as hereinafter described. One end, the tubular hub 21 is open as indicated at 29, FIGURE 12, and receives the end of stem S as shown in FIGURES 7 and 14. The other end flares outward and blends into the disk or cap 22. The disk, or cap, 22 is relatively thin, easily bendable, and free of sharp edges. The opening at 29 extends through the collar member C and is threaded internally to receive the external threads formed by parts 18a and 18b of the stem S. The collar member C may be rotated in relation to stem S to vary the position of the collar along the stem S and thus accommodate the user as hereinafter described. The collar member C overlays the flesh adjacent the mouth of the cervix to seat on the same and prevent movement of the cannula towards the uterus (FIGURES 25–26).

Figure 18:
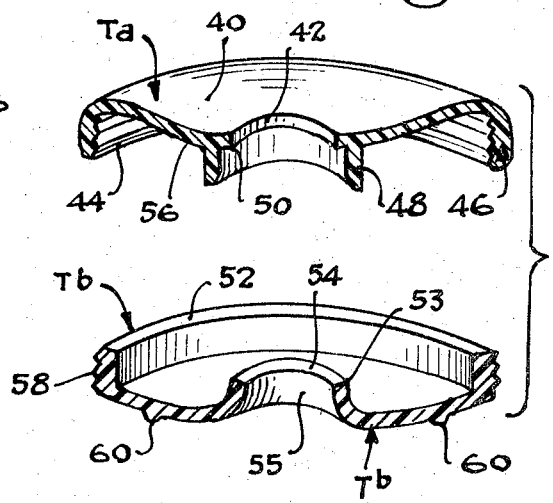
FIGURE 18 is a perspective view in section of the preferred form of the treatment cassette with the parts shown in exploded relation.
Figure 19:
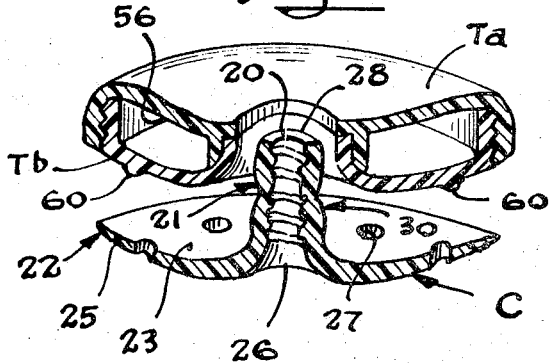
FIGURE 19 is a view of the cassette of FIGURE 18 in assembled condition and in exploded relation to the collar and stem members.
Figure 27:
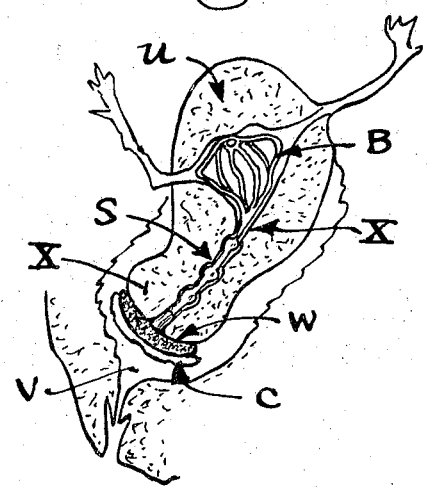
FIGURE 27 is a schematic saggital section of a normal uterus containing the cannula with collar attached with medication wafer in place.
Figure 28:
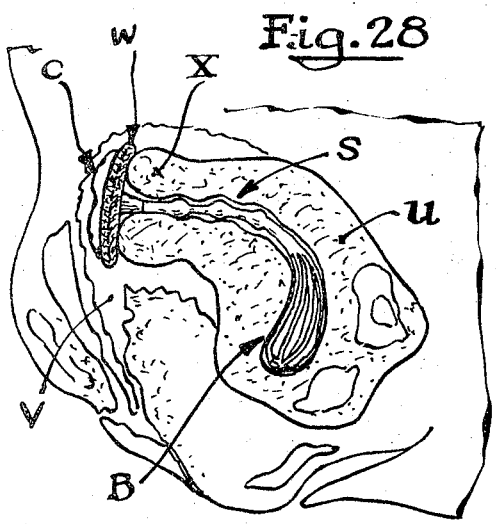
FIGURE 28 is a schematic saggital section of a retroverted uterus containing the collared cannula with the medication wafer in place.
Figure 29:
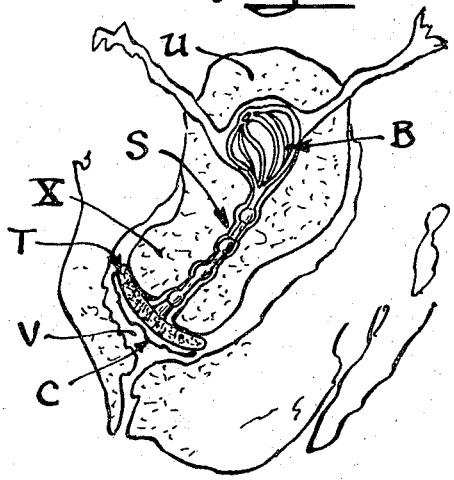
FIGURE 29 is a schematic saggital section of a normal uterus containing the collared cannula with the treatment cassette in place.

The collar C has also the important function of a medication carriage, in which case the cap portion 22, of the collar member C may receive an annular medicating device. Such device may be in the form of medicament alone, or container of the same (FIGURES 15–19) which is of appropriate shape and size to slip over the hub 21 and, in use, fit between the concave surface of the collar member C and the cervix (FIGURES 27–29). One such device is in the form of an annular medication impregnated wafer, indicated variously as F or W in FIG-URES 15–17. Another is in the form of a cassette for medicament, as shown in FIGURES 18 and 19. As hereinafter described, the holes 27, on the collar member, or some of them, may coact with one or more protuberances on the medicating device to anchor the same against rotation. If desired, the convex surface of the flange 22 of the collar C may be marked by a series of concentric, grooves or ridges, 25, FIGURE 13, which are size markings, small, and medium (the outside edge being the large size) along which the flanged portion may be easily, accurately, and appropriately cut to fit the anatomy of the patient.

As above described, the cannula in its preferred form defines external threads through the approximation of portions 18a and 18b of the stem S. The hub portion 21 of the collar member C has mating internal threads as indicated in FIGURES 7–14. These threads serve to anchor the collar C in position lengthwise of the stem S. They also permit adjustment of the position of the collar C in relation to the stem S. It is only necessary to turn the flanged portion 22 of the collar C to move it lengthwise along the stem S. This can be done while the cannula is in the cervix and uterus.

If desired, interengaging conformations other than threads may be used to anchor the collar in relation to the stem. For example a series of annular grooves may be provided on the stem and one or more annular ridges may be provided in the bore of the collar C to fit on the grooves. Another alternative is to use mutilated threads on the stem and the bore of the collars, with the mutilations aligned so that the collar C in one position in relation to the stem S is freely slidable along the stem and then can be turned to engage the threads and anchor the same.

When the cannula stem S is adjusted to the length of the cervical canal and fundal position of the uterus, the collar member C overlays the flesh of the cervix. The cannula C is then held secure against inward movement by the flange 22 of the collar C, by the bulbar enlargements formed by portions 14a and 14b of the stem S within the cervical canal, and by the action the spider arms 12a and 12b of the head B. The positions of the parts in relation to the anatomy that gives this action are shown in FIGURES 25–29. The cannula is held from falling out by the action of the spider arms 12a and 12b of the spindle B, and also by the enlargements formed in the stem S by parts 14a and 14b. Thus there is defined a continuous, stable channel from the interior of the uterus, thru the cervical canal, into the vagina.

The cannula stem and bulb portions are formed of a highly flexible plastic material readily tolerated by the body. Soft polyethylene is a preferred material for this purpose, although other materials such as well plasticized vinyl resins may be used. The parts can be formed by molding in the shape shown in FIGURES 4 and 5. This molding operating is accomplished without undue difficulty since the shapes involved can be accommodated in a mold having no cores or other complications. When thus made, the material of the stem and bulb is highly flexible, particularly the arms 12a and 12b that define the bulb B. These arms accordingly accommodate themselves to the shape of the uterus without tending to cut or abrade the sensitive walls of the same. As shown in the frontal and saggital sections of FIGURES 26 and 27, the arms 12a and 12b may be flexed down in a mushroom-like shape (FIGURE 26) or may remain largely in their bulb-defining shape (FIGURE 27). Alternatively, as in FIGURE 28, when the uterus defines an elongated cavity, the arms accommodate themselves to that shape by a similar elongation of the bulb they define. FIGURE 29 shows the cannula with the bulb B flexed to accommodate still another position of the uterus and shape of the uterine cavity.

When molded of soft polyethylene the stem S is also highly flexible. It thus can accommodate varying shapes of the cervical canal. In FIGURE 26, the cervix is shown substantially straight, requiring no flexure of the stem S. In FIGURES 25–29, the cervix has varying degrees of bend, all of which are accommodated by the flexibility of the stem S as shown.

It will be noted that in FIGURES 6 and 7 the portions 13a and 13b of the stem S are shown as substantially straight, and all of the bending in flexing from the positions of these FIGURES 4 and 5 to the positions of these FIGURES 6 and 7 is that of the arms 12a and 12b. This is accomplished by reason of the small bending modulus of the respective arms 12a and 12b, as well as their combined bending modulus, in relation to the bending modulus of the parts Sa and Sb. That is, when the ends of stem parts Sa and Sb are held together by the collar C as in FIGURE 7, the bending movement in relation to the resistance to bend along the respective parts cause the arms 12a and 12b to undergo substantially all of the bending. However, because of the similar modulus differential between the bulbous stem portions 14a and 14b, and the rest of the stem parts Sa and Sb, respectively, the stem S itself has a degree of flexibility, and may be additionally bent manually if desired to adapt to unusual uteroversion or flexion.

The cannula is best introduced through the use of the introducer rod shown in FIGURE 20. This rod is about 10″ long and is made of plastic which is relatively stiff as compared with the stiffness of the cannula itself. It has a threaded end 31 with threads capable of mating with the internal threads defined by portions 19a and 19b, FIGURE 7, of the stem S. At the end opposite threaded end 31, the cannula forms a short hollow well. 32. This well is of diameter of slightly larger than the opposite diameter of the threaded end defined by parts 17 and 18 of the stem S. End 32 thereby defines a socket capable of holding the stem part S in the approximated position of FIGURE 7 and FIGURE 19 as hereinafter described. When the cannula is to be assembled for use it preferably is adjusted to the anatomy of the user especially the length of the cervical canal. This may be done by sounding the uterine canal and cavity with a long cotton application swab, dipped in a suitable colored disinfectant. The swab is then withdrawn. The colored disinfectant will indicate the extent the swab has been telescoped into the cervical canal. The swab should not be pushed in far enough to reach the fundus of the uterus, but only until it is felt passing the internal os. The swab then indicates the required length of the stem S, measured from the point where the arm 12a and 12b converge and form the stem. The portion of the stem tip distal to the length thus measured is then cut off with scissors or a knife (as along line x—x, FIGURE 14) to provide a cannula of the length required by the patient measured. With the stem S thus cut, the collar C is at correct position when the end of the stem is within the confines of the central drainage hole 26, of the collar member C, as shown in FIGURE 7.

The cannula unit is shown assembled for insertion in FIGURE 7. As shown, the unit of FIGURES 5 and 6 is folded and held together by the collar C. Preparatory to the insertion step, one-half part of an apothecary's gelatin capsule G, FIGURE 21, is inserted over the apex or dome portion of the radially compressed bulb part B. This gelatin capsule half is of tubular shape with a closed end, as shown. Preferably the bore of the capsule is somewhat larger than the most radially compressed diameter of the spindle bulb B to be telescoped within the capsule. The capsule thus serves to hold the arms 12a and 12b in a more pointed conformation than otherwise would exist and insertion through the cervix is thereby facilitated.

For the cannula insertion step, the introducer rod R, FIGURE 21, is threaded into the internal threads formed by parts 19a and 19b, FIGURE 7, as is shown in FIGURE 21. The cannula now may be held by the rod R. For the actual step of insertion, the capsule G (and apex of bulb B) is placed in position over the mouth of the cervix. Then the cannula is then inserted by pushing the rod in direction to force the gelatin acpsule G into the cervical canal. The gelatin capsule, and hence the cannula, is thereby forced through the cervix and into the uterus, where the gelatin capsule and the spindle bulb B, may contact the most remote wall of the uterus. The gelatin capsule quickly melts due to body heat, leaving the unit in the uterus as, for example, is shown in FIGURE 25. If the length of the stem S is proper in relation to the anatomy of the user, the cap C will at this time seat against the portions of the flesh adjacent the mouth of the cervix and the arms 12a and 12b will rest within the uterus as shown in FIGURES 25 to 27.

Should it be clinically desirable to do so, the cannula can be used with only the hub portion 21 of the collar C. This may be accomplished by cutting hub 21 at the groove 30 provided for this purpose. FIGURE 22 shows the rod R, the cannula, and the hub 21 assembled for insertion in this condition. In this form, the cap C does not cover the mouth of the cervix, a condition that may be desired clinically. The hub 21 aids in holding the cannula against upward movement. The bulbar enlargements formed by parts 14a and 14b of the stem S also help maintain the cannula in position. Inserting the cannula thusly modified is the same as with the intact collar C.

The cannula of the present invention may also be used without any portion of collar C as noted hereinabove and as shown in FIGURES 23 and 24. In such case the stem S is cut to the required length (as at x—x, FIGURE 14) which cut should never be above the external threads defined by the stem parts 18a and 18b. The cannula (FIGURES 23 and 24) is then held in folded position by the cervical musculature, which serves to keep it approximated without additional help. The bulbar enlargements of the stem S and the spindle head B together oppose movements of the cannula in the cervical canal. In such use, the insertion of the cannula is accomplished as described, with reference to FIGURE 23, wherein the ends of the approximated portions 17a and 17b of the stem S are placed in the welled end 32, of the introducer rod R as shown in FIGURE 23. Removal is accomplished however, by the use of the threaded end 31 of Rod R as is shown in FIGURE 24. It should be noted that the socket 32 of the rod R serves, during insertion of the cannula without cap C, as a temporary holding device. FIGURE 24 shows the cannula in position without the collar C.

With the collar C in place, as in FIGURES 2, 7, 22, the approximated parts Sa and Sb of the cannula stem S are held in longitudinal alignment by the internal threads of the collar. When the cannula is inserted without the collar, the collar is not available for this purpose. The valve members 16a and 16b, FIGURES 7, 8, 10 tend in some measure to resist longitudinal movement of part Sa in relation to part Sb. In addition the other portions of the structure as well as the flesh of the user to resist such movement. If additional resistance to such relative movement is desired, it may be obtained by providing one or more teeth on the portions 13a, 15a, and 17a, and mating sockets on the portions 13b, 15b, and 17b, so that the teeth mate in the sockets when parts Sa and Sb are approximated and these parts are thereby held against relatively longitudinal movement. Removal of the cannula may be accomplished by threading end 31 of the rod R into the internally threaded end of the cannula defined by parts 17a and 17b, and 18a and 18b. The rod R may then be withdrawn, taking the cannula with it. FIGURE 24 shows the parts positioned for such removal.

Variations of the spindle headed stem cannula are set forth in FIGURES 30 through 33 of the drawings. As set forth in the modification of FIGURE 30 the collar C of the cannula is molded integral with the stem portion Sb' of the assemblage to define an integral collar-stem-cannula unit. The collar C, as shown, preferably is molded to define an integral unit with one member of the split stem Sb' thereby to define a pin-type construction wherein one free end of the stem half Sa' is insertable into the opening C² of the collar extension C³. The internal wall of the split stem member S', preferably, is threaded as defined hereinabove in conjunction with the cannula of FIGURE 1, for example, to provide a convenient means for removal of the cannula with the removal rod R, FIGURE 20.

FIGURES 31A and 31B are fragmentary side and top views, respectively of a modified spindle head for the cannula showing toroidial-type web members on the head. This type of spindle head will provide increased axial resiliency with respect to the type illustrated in FIGURE 1, for example, in that the individual webs do not collapse totally in compression but rather in flexure, requiring less flexure force.

Another modification of the spindle head is illustrated in the fragmentary side and top views of FIGURES 32A and 32B, respectively. In this form of head the web members are not joined at the top but define continuous looped members joined at either end to the respective portion of the split stem, as shown in 32A, except for the two end transition members which are joined to opposite sides of the split stem to hold the unit together.

Still another modification of the spindle head is shown in the fragmentary top and side elevations of FIGURES 33A and 33B. As shown each of the individual webs of the spindle head is folded at approximately the mid point between the top joiner of the webs and the upper terminal of the split stem member. Again, the web members are deflectable in flexure rather than in combined flexure and compressive manner. This provides increased flexibility to the spindle head of the cannula to enhance the acceptability of the device.

Figure 15:
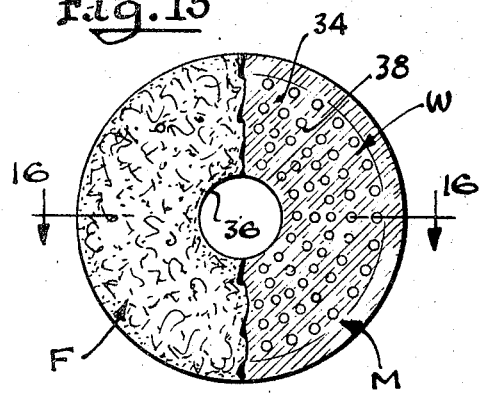
FIGURE 15 is a composite split view of two variations of the medication wafer.
Figure 16:
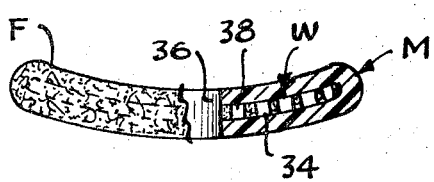
FIGURE 16 is a cross-section of the wafers of FIGURE 15, taken along line 16—16 of FIGURE 15.
Figure 17:
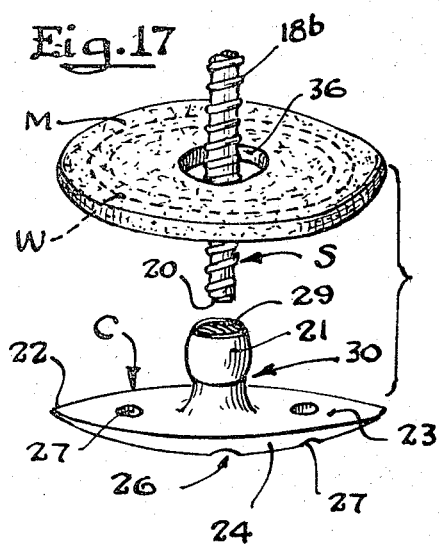
FIGURE 17 is a perspective view showing the stem with the medication ring of FIGURES 15 and 16, and the collar member.

As above mentioned a medication system may be provided through the use of a medication ring or wafer encircling the hub 21 of the collar C. In FIGURES 15–17, such a ring is shown at W. It preferably is in the form of a completely perforated wafer of plastic or other material with a central aperture 36 of sufficient diameter to slip over the hub 21 of the collar C. The wafer preferably is approximately the diameter of collar C and either is initially concavo-convex or of a material that readily accommodates to the concave side of the collar C. The wafer W may be coated with, or incorporated within a suppository material carrying the appropriate medicament. Alternatively, the wafer, FIGURES 15–16, may be of a cellular plastic or other cavernous material indicated by F, FIGURES 15–16, containing impregnated medication. Alternately, a solidified medication may be molded into the above described forms as a wafer or a spongy ring.

In use, the medicated wafer ring W telescopically is inserted over the hub 21 of the collar member C as is shown in FIGURE 17. The wafer rests on the concave surface of the collar C. When the unit is in place, as is shown in FIGURES 27 and 28, the wafer is sandwiched between the flesh adjacent the mouth of the cervix, and the collar C. The wafer W thus is at the cervical os where medication usually is to be applied.

The annular medicating device may also be in the form of a cassette, as is shown in FIGURES 18 and 19. As shown, the cassette is made of two separate parts. The upper, or closure part, designated Ta in FIGURES 18 and 19, is in the form of an externally concave surfaced ring 40 with a center hole or aperture 42. The diameter of the aperture is slightly larger than the diameter of the hub 21 of the collar member C as shown in FIGURE 19. Formed along the perimeter of part Ta is a skirt-like rounded edge 46. The skirt 46 is internally threaded along its inside suface as indicated at 44. Central to the inside surface 56 of the closure portion Ta there is a tubular collar 48 of substantially the same axial length as the skirt 46. This collar has a slightly larger diameter than the diameter of edge 42, forming an annular seat 50 as shown.

The other part of the cassette is indicated at Tb. This part has an annular portion 55 which defines an upstanding neck 53 at its inside edge. The outside diameter of the neck 53 is slightly less than the inner diameter of the annular collar 48 of the part Ta of the cassette member T. This upstanding neck 53 terminates in an annular flat seat 54 which seats against annular seat 50 as shown in FIGURE 19. The part Tb also has an upstanding rim or edge 52 which is externally threaded at 58. The threads 58 are received by threads 44 to secure parts Ta and Tb together as shown in FIGURE 19, thereby defining a toroidal space 56 to contain therapeutic material such as a radioactive material for radiation therapy. If desired the walls of parts Ta and Tb may be porous or apertured so that a chemical medicament contained in cavity 56 slowly exudes out of the cavity and is thereby made effective in acting on the body.

When the cassette is used for the containing and carriage of radio-active material, the internal surface may be lined with lead foil to localize exposure to the areas desired to be treated. In such instance it is desirable to anchor the cassette against rotation in relation to collar C. Anchor pins 60 are provided on the bottom part of the cassette as shown in FIGURES 18 and 19. These are received in holes 27 of the collar C, thereby holding the cassette against rotation in relation to the collar. FIGURE 29 shows the treatment cassette mounted and in position of use within the uterus.

If desired a suitable bacteriocidal or bacteriostatic agent, or other therapeutic agent may be incorporated into the material of the cannula, to provide some degree of disinfection or other desirable effect in all regions exposed to the plastic material.

In the figures, the uterus is indicated at U, the cervix at X and the vagina at V.

In the modification of FIGURES 34 the collar C" is integrally formed with one-half 70 of the two part split stem S". The other half 72 of the split stem S" is freely flexible away from the opening 74 of the collar and is adapted to insertion therein to hold the halves 70 and 72 in registration in juxtaposed approximated position for insertion into the uterine canal. As illustrated, the split halves 70 and 72 are integrally joined at the top at 76, the member being illustrated without the bulbous head portion characteristic of the devices previously defined.

FIGURE 35 illustrates still another of many modifications wherein the split stem portions 78 and 80 of the stem S''' are integrally formed with the collar member C'''. In this form of the invention the free ends 79 and 81 of the halves 78 and 80, respectively, may be flexed away from mating relation as shown by the dashed lines in FIGURE 35. This flexural characteristic permits convenient formation of an open channel within the split stem portions and molding of the valve members (previously described in detail) therein for use of the modified member in the manner defined hereinabove.

It will be observed that the drawings show varying designs and proportions of the parts of the cannula. It will be understood that these and other variations may be used if desired. It will of course be understood that many variations and alternative embodiments of the present invention may be made without departing from the true spirit and scope of this invention. I therefore intend by the appended claims to cover all modifications and alternative construction falling within their true spirit and scope.

What I claim as new and desire to secure by Letters Patent of the United States, is:

1. A unitary uterine cannula comprising: a tubular stem portion adapted to fit snugly in the cervix; and a head portion adapted to be embraced by the walls of the uterus, the head portion consisting of a plurality of looping flexible arms defining a deformable bulbous portion, the arms having their ends unitary with the stem portion, said stem portion defining a series of longitudinally axially spaced bulbar enlargements along with the said stem, the end of said stem remote from the head portion defining an internal threaded conformation adapted to receive an externally threaded rod for insertion and withdrawal of said cannula into and from the uterus, respectively.

2. A uterine cannula comprising: a tubular stem portion adapted to fit snugly in the cervix; a head portion adapted to be embraced by the walls of the uterus, the head portion consisting of a plurality of looping flexible arms defining a deformable bulb having their ends unitary with the stem portion, said stem portion defining a series of bulbar enlargements at spaced intervals therealong, said enlargements being of greater inside diameter than that of the rest of the stem, said enlargements having valve parts which are in longitudinal alignment and permit fluid passage within said stem in one direction while arresting flow of fluid in the opposite direction, the internal surfaces of the ends of said stem remote from the head portion defining an internal threaded conformation adapted to receive an externally threaded rod used in the insertion and withdrawal of the cannula; an aperture defining collar portion integral with said stem on a portion thereof remote from the head, to define a unitary cannula; means of medication attachable to said collar portion.

3. A uterine cannula comprising: a tubular stem portion adapted to fit snugly in the cervix; a head portion to be embraced by the walls of the uterus, the head portion consisting of a plurality of looping flexible arms having their ends unitary with the stem portion; an aperture defining collar portion formed integrally with the stem end remote from the head portion to define a unitary cannula; the ends of said stem within the confines of the collar aperture defining an internal threaded conformation adapted to receive a threaded rod for insertion and withdrawal of said cannula; and a medicating annulus telescopically received over the stem between the head thereof and the collar, said annulus having interengaging conformations effective to anchor it on the collar against rotation in relation to said collar, said annulus defined by a shape retaining medicamentous material disintegrating slowly over a given period of time.

4. A uterine cannula having a tubular stem portion adapted to fit snugly in the cervix; a head portion adapted to be embraced by the walls of the uterus, the head portion consisting of a plurality of looping flexible plastic arms having their ends unitary with the stem portion, the ends of the stem remote from the said arms defining an internally threaded portion adapted threadably to receive an externally threaded rod for insertion and withdrawal of said cannula, and defining external threaded conformations; a collar member defining an internally threaded aperture adapted to be received on the external threaded stem ends to secure said members together, said collar being longitudinally adjustable along the stem; and a medicating annulus telescopically received over the stem between the head thereof and the collar, said annulus having interengaging conformations effective to anchor it on the collar against rotation in relation to said collar, said annulus being defined by a chemically inert form retaining material of predetermined thickness, density and porosity.

5. A unitary uterine cannula comprising: a headed stem defined by a unitary lengthy plastic body having complementary folded halves about its longitudinal midpoint and extending for part of its length in each direction from the midpoint in a plurality of flexible arms defining a first apex substantially at the midpoint and a second apex remote therefrom, the arms defining a readily deformable hollow head the remainder of said body defining a split stem, the portions of the stem other than the arms being of semi-circular cross-section to define a tubular form; the internal surfaces of the ends of the stem remote from said arms defining an internal threaded conformation.

6. A unitary uterine cannula, comprising: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, the arms defining a readily deformable bulbous head the remainder of said body defining a split stem, the portions of the stem other than the arms being of semi-circular cross-section to define a split tubular form, the internal surfaces of said stem ends remote from the headed portion defining internal threaded conformations adapted to receive the externally threaded end of a rod for withdrawal of said cannula from the uterus, said rod defining an apertured depression at its other end to receive the split stem end in insertion of said cannula into the uterus.

7. A unitary uterine cannula comprising: a headed stem defined by a unitary lengthy plastic member having complementary halves folded about its longitudinal midpoint in a plurality of flexible arms, forming a first apex substantially at the mid-point, and a second apex remote therefrom, the arms defining a readily deformable bulbous head the remainder of said member defining a split stem, the portions of the stem other than the arms being of semi-circular cross-section to define a tubular form and forming a series of semi-bulbar enlargements which cooperate with each other when the complementary cannula member halves are folded together to define a series of bulbar stem enlargements at spaced intervals.

8. A unitary uterine cannula comprising: a headed stem defined by a unitary lengthy plastic member having complementary halves folded about its longitudinal midpoint and extending for part of its length in each direction from the mid-point in a plurality of flexible arms forming a first apex substantially at the midpoint, and a second apex remote therefrom, the arms defining a readily deformable bulbous head the remainder of the member defining a split stem, the portions of the stem other than the arms being of semi-circular cross-section to define a tubular form, said tubular formed stem having mating valve parts which, are in longitudinal alignment and permit fluid passage within said stem in one direction while arresting the flow of fluid in the opposite direction.

9. A unitary uterine cannula comprising: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, whereby the arms define a readily deformable hollow head when the ends of the stem are folded against each other to define a split stem, the portions of the stem other than the arms being of semi-circular cross-section to define a tubular form when folded against each other and having mating valve parts which in the folded condition of the stem are in longitudinal alignment and permit fluid passage in one direction while arresting the flow of fluid in the opposite direction, said mating valve parts including at least one deformable valve member affixed to the concave face of the semi-tubular stem parts; the stem parts having annular bulbar enlargements at said valve members to anchor the same about a greater radius than the radius of the tubular form defined by other portions of the valve stem.

10. A two-part uterine cannula, comprising in combination: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, the arms defining a readily deformable bulbous head the remainder of said body defining a split stem of tubular conformation; the internal surfaces of the split stem ends remote from the headed portion define an internal threaded conformation to receive the externally threaded end of a rod used for the insertion or withdrawal of said cannula from the uterus; the external surfaces of the said split stem ends defining an external threaded conformation; a collar member defining a threaded aperture adpted to be received on the external threaded portion of the stem.

11. A two-part uterine cannula comprising in combination: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, the arms defining a readily deformable bulbous head the remainder of the body defining a split stem of tubular conformation; and a collar member defining an aperture receiving the ends of the stem and defining a unitary structure, the exit surfaces of the end portions of the stem and the aperture of the collar member having interengaging conformations effective to secure the member against longitudinal movement in relation to the stem, said conformations defining adjustable locating means for the collar member longitudinally of the stem to accommodate said cannula to the anatomy of the user.

12. A uterine cannula comprising in combination: a headed stem defined by a unitary lengthy plastic body having complementary halves folded about its longitudinal midpoint and extending for part of its length in each direction from the midpoint in a plurality of flexible arms defining a first apex susbtantially at the midpoint; and a second apex remote therefrom, the arms defining a readily deformable bulbous head the remainder of the body defining a split stem of tubular conformation; a collar member defining an aperture receiving the ends of the stem to define a unitary structure; and a medicating annulus telescopically received over the stem between the head thereof and the collar member, the surfaces of the collar and the annulus having interengaging conformations effective to anchor the annulus against rotation in relation to the collar when seated against the collar.

13. A uterine cannula comprising in combination: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, the arms defining a readily deformable bulbous head the remainder of the body defining a stem of split tubular conformation; and a collar member defining an aperture receiving the ends of the stem and defining a unitary structure, the external surfaces of the end portions of the stem and the aperture of the collar member having interengaging conformations effective to secure the member against longitudinal movement in relation to the stem; and a medicating annulus telescopically received over said stem between the head thereof and the collar member, the surfaces of the collar member and the annulus having interengaging conformations effective to anchor the annulus against rotation in relation to the collar when seated thereon, said annulus being defined by a form retaining medicamentous material adapted to disintegrate within a given period of time.

14. The cannula of claim 12 wherein the annulus is in the form of a thin wafer.

15. The cannula of claim 13 wherein the annulus is a vessel-shaped, two-part container defining a vehicle for the means of medication.

16. A uterine cannula comprising in combination: a headed stem defined by a unitary lengthy plastic body having complementary halves folded about its longitudinal midpoint and extending for part of its length in each direction from the midpoint in a plurality of flexible arms defining a first apex substantially at the midpoint and a second apex remote therefrom, the arms defining a readily deformable hollow head, the remainder of the body defining a split stem, the portions of the stem other than the arms being of semi-tubular cross-section to define a tubular form and having mating valve parts which are in longitudinal alignment and permit fluid passage in one direction, while arresting the flow of fluid in the opposite direction, said mating valve parts including at least one deflectable valve member affixed to the concave internal tubular surface of the split tubular stem; the split tubular stem defining bulbar enlargements at said valve members to anchor the same about a greater radius than the radius of the tubular form defined by other portions of the split stem; and a collar member defining an aperture receiving the ends of the stem to define a unitary stem, the external surfaces of the end portions of the stem and the aperture of the collar member having interengaging conformations effective adjustably to locate said collar member lengthwise of the stem thereby to accommodate the cannula to the anatomy of the user and to fix the collar member against longitudinal movement in relation to the stem.

17. A unitary uterine cannula comprising: a headed stem portion defined by a unitary lengthy plastic body having complementary halves folded about its longitudinal mid-point and extending for part of its length in each direction from the mid-point in a plurality of flexible arms forming a first apex substantially at the midpoint, and a second apex remote therefrom, the arms defining a readily deformable bulbous head, the remainder of the body defining a split stem, the portions of the stem other than the arms being of semi-circular cross-section to define, when folded, a tubular form; and collar portion defining an aperture, said collar being integrally joined to one of the complementary stem halves at the end thereof remote from the head, said collar adapted to receive the other free and unattached complementary stem half end in juxtaposition within said aperture to define a unitary cannula, the internal surfaces of the stem ends defining an internal threaded surface adapted to receive the externally threaded end of a rod to facilitate insertion and withdrawal of said cannula.

18. A unitary uterine cannula comprising: a tubular stem portion defined by a lengthy plastic body having complementary semi-tubular halves folded about its longitudinal midpoint forming an apically united split tubular stem defining a series of linearly arranged complementary semi-bulbar enlargements along each of said stem halves; and an aperture defining collar portion integral with one of said stem halves at the end thereof remote from the apical junction of said stem halves, said collar portion receiving the free end of the complementary stem half in juxtaposition within the confines of the collar aperture, the internal surfaces of said stem half ends defining internal threads adapted to receive the externally threaded end of an appropriate rod to facilitate insertion and withdrawal of cannula into and from the uterus, respectively.

References Cited by the Examiner

UNITED STATES PATENTS

| | | | |
|---|---|---|---|
| 404,019 | 5/1889 | Sperry | 128—131 |
| 1,719,428 | 7/1929 | Friedman | 128—242 |
| 1,870,942 | 8/1932 | Beatty | 128—241 |
| 2,564,177 | 8/1951 | Schmitt | 128—131 |
| 2,616,421 | 11/1952 | Greenberg | 128—2 X |
| 2,649,092 | 8/1953 | Wallace | 128—349 |
| 2,730,101 | 1/1956 | Hoffman | 128—305 |
| 2,896,614 | 7/1959 | Schmitt et al. | 128—131 |

FOREIGN PATENTS

| | | |
|---|---|---|
| 426,585 | 3/1926 | Germany. |
| 587,231 | 11/1933 | Germany. |

RICHARD A. GAUDET, *Primary Examiner.*

C. F. ROSENBAUM, *Assistant Examiner.*